Sept. 23, 1952     J. ROURKE ET AL     2,611,707
METHOD AND APPARATUS FOR MANUFACTURING MARGARINE
Filed March 23, 1949     3 Sheets-Sheet 1
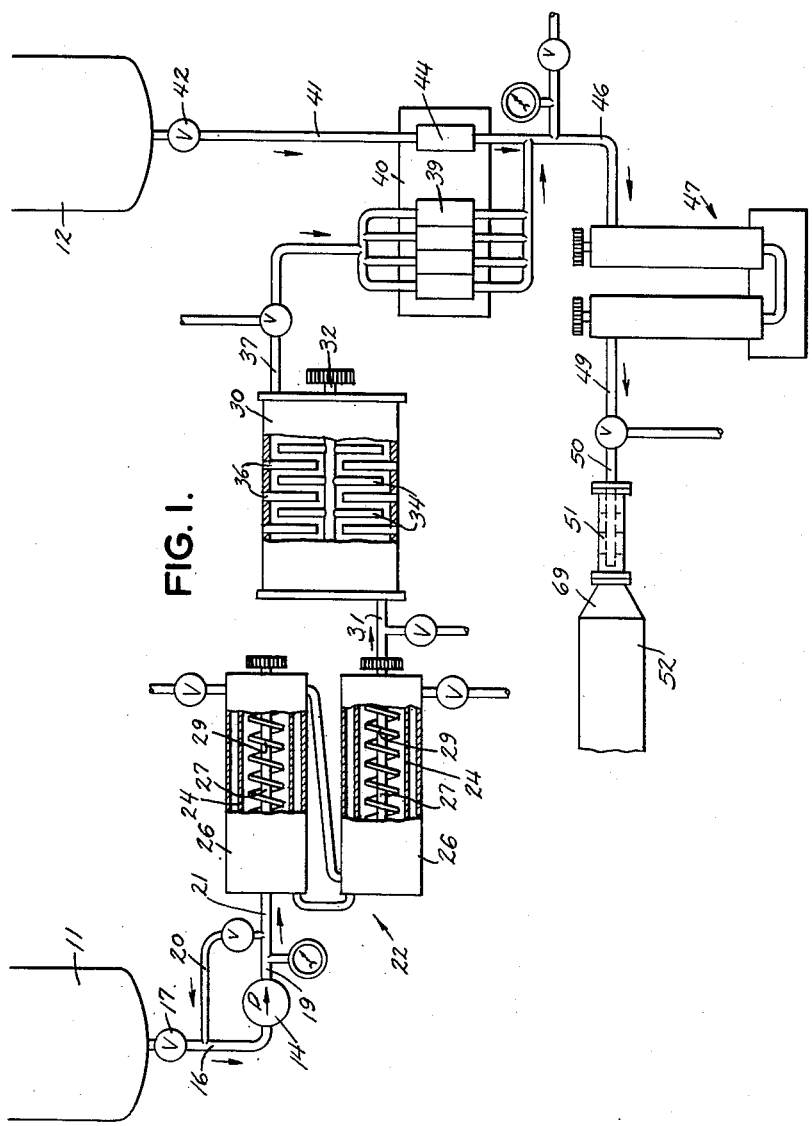
INVENTORS
JOHN ROURKE
WILLIAM THRONTON DOW
BY
Campbell, Brumbaugh, Free & Graves
THEIR ATTORNEYS

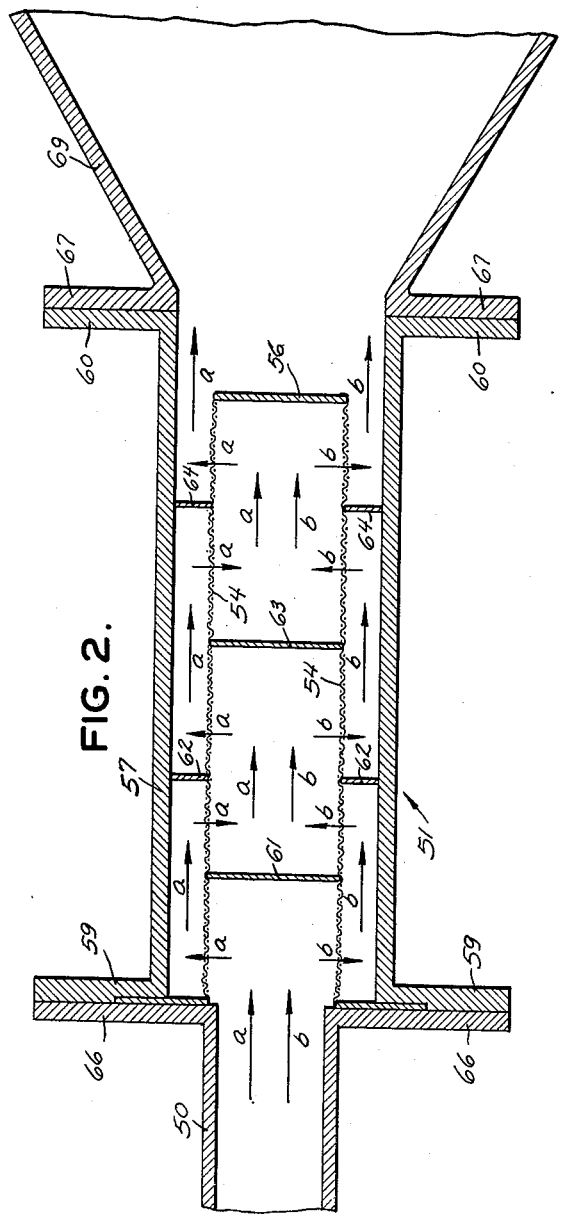

Sept. 23, 1952 J. ROURKE ET AL 2,611,707
METHOD AND APPARATUS FOR MANUFACTURING MARGARINE
Filed March 23, 1949 3 Sheets-Sheet 3

INVENTORS
JOHN ROURKE
WILLIAM THRONTON DOW
BY

Campbell, Brumbaugh, Free & Graves

THEIR ATTORNEYS

Patented Sept. 23, 1952

2,611,707

UNITED STATES PATENT OFFICE 2,611,707

METHOD AND APPARATUS FOR MANUFACTURING MARGARINE

John Rourke, Bebington, and William Thornton Dow, Upton, England, assignors to Lever Brothers Company, Cambridge, Mass., a corporation of Maine Application March 23, 1949, Serial No. 83,034
In Great Britain April 1, 1948

12 Claims. (Cl. 99—122)

This invention relates to improvements in the manufacture of margarine.

A continuous process of manufacturing margarine is known in which liquid fat is continuously mixed with aqueous ingredients in the desired proportions and the mixture subjected to continuous rapid chilling and simultaneous emulsification in a processing apparatus, commonly known as a Votator. This type of apparatus is described in A. E. Bailey, "Industrial Oil and Fat Products," Interscience Publishers Inc., New York (1945), pages 702 to 708. This Votator comprises one or more thin-walled nickel tubes surrounded by a suitable low temperature cooling medium such as evaporating liquid ammonia. The tubes are provided with internal rotating blades which remove the thin film of chilled material from the wall of the tubes. After chilling, the mixture, which is nucleated with minute fat crystals, passes to a crystallizing unit where it is allowed to set.

Such a process, by itself, produces a product which tends to be heterogeneous in texture, owing to the presence of lumps. After the margarine has been allowed to stand for a day or two these lumps are often indistinguishable in texture from the rest of the margarine. Their presence, however, is revealed by the existence of patches or streaks of a distinctly lighter color than the remainder of the material. Such an appearance is unattractive.

To make the consistency of the product more uniform, it is usual to include in the crystallizing unit one or more wire mesh screens through which the chilled and emulsified material passes. Such screens serve to break up the lumps. At the same time they submit the product to a certain amount of mechanical working.

It is often found that with the amount of working involved in breaking up the lumps to give the product the desired uniform consistency, it is undesirably soft on issuing from the crystallizing unit. On the other hand, if the amount of working which is given to the margarine is reduced sufficiently to give a harder product, it is found that the consistency is not uniform, as the working has not broken down all the lumps.

It has now been discovered that a uniform consistency may be imparted to the margarine leaving the crystallization unit, while at the same time softening the material to a lesser extent than by known methods, if the material, after it has been chilled but before it has completely set, is passed through one or more mesh screens and is then caused to undergo a sudden change in its direction of flow immediately after its passage through each screen. It is found that as soon as this homogenizing action has finished, it is desirable that the material should be allowed to set in as near a condition of rest as possible, as a shearing action on the material is liable to have an undesirable softening effect. These conditions are achieved by suitable design of the conduit carrying the material.

Thus the present invention consists in an improved continuous process for manufacturing margarine which comprises continuously and rapidly chilling and emulsifying the ingredients thereof, homogenizing the chilled and emulsified material by passing a stream thereof through one or more mesh screens before it has completely set, causing said stream to undergo a sudden change in direction of flow after passage through said screen or screens, and allowing the material to set to its final consistency with the minimum of interference by forces liable to cause shearing therein.

Copending patent application Serial No. 83,076, now Patent No. 2,592,224, contains a discussion of how margarine may exhibit what is referred to as a "thickness" or "heaviness" on the palate. These terms are used to describe the quality of a margarine which remains in the mouth for an appreciable time in a viscous pasty condition, instead of melting quickly, as does a "thin" margarine. The application also describes how an improvement in the "thinness" and also the "spreadability" of margarine made in the Votator may be effected by cooling and agitating a stream of liquid fat so as to control the separation of the higher melting point glycerides therein as crystalline particles. Either before or after this step of cooling and agitating, the liquid fat is mixed with the aqueous ingredients and the resulting mixture is thereafter subjected to continuous rapid chilling and emulsification. Arrangements are described whereby a portion or the whole of the fat, before entering the Votator, is chilled in a cooler supplied with a circulating cooling medium, and thereafter agitated in a crystallizing unit. In a modification, part of the supercooled margarine issuing from the Votator is passed back into the incoming fat stream to effect cooling. It is found that the present invention is particularly applicable to the process of producing margarine described in this copending application, being especially of advantage in enabling the production of a material which has the right consistency for immediate molding and packing into blocks or "prints."

Thus the present invention further includes a continuous process for producing margarine which comprises the steps of cooling and agitating a stream of liquid fat so as to separate higher melting point glycerides therein as crystalline particles, mixing the fat with the aqueous ingredients in the desired proportions for producing margarine either prior to or after the step of cooling and agitating, subjecting the resultant mixture to continuous rapid chilling and emulsification, homogenizing the chilled and emulsified material by passing a stream thereof through one or more mesh screens before it has completely set, causing said stream to undergo a sudden change in direction after passage through said screen or screens, and allowing the material to set to its final consistency with the minimum of interference by forces liable to cause shearing therein.

The invention also provides apparatus for carrying out the above process comprising means for continuously and rapidly chilling and emulsifying the ingredients, means for passing the chilled and emulsified material through one or more mesh screens before it has completely set, means for causing the stream to undergo a sudden change in direction after passage through said screen or screens, and means for allowing the material to set to its final consistency with the minimum of interference by forces liable to cause shearing therein.

The sudden change in the direction of flow of the stream, for example through a right angle, may be produced by a suitable bend in the conduit carrying the material or may be produced by suitable obstructions located in the path of the stream after each mesh screen. In a preferred form the device comprises a wire gauze cylinder contained in an external tube of larger internal diameter than that of said cylinder and a number of baffle plates for deflecting the margarine to pass inwardly and outwardly through said cylinder. To ensure the minimum of interference by forces liable to cause shearing in the stream of material as it sets to its final consistency, the stream may be passed to a location of setting through a conduit of progressively increasing cross-sectional dimensions.

It is essential to the success of the process of the invention that the homogenization be carried out at a stage in the process where the chilled and emulsified material has just the right consistency. If the homogenizing is attempted at too late a stage in the process, although homogenization is effective, the device intended for homogenizing works the solidified material too much and the final product is in consequence too soft. The material should however be viscous enough to force the lumps through the screens; it is useless to place the device at a point where the greater proportion of the fat is still in a liquid supercooled condition, as solid lumps therein will not be dispersed into the liquid, but will be merely filtered from the liquid and forced through the screens en masse at irregular intervals without being dispersed. To correct such a fault, the supercooled liquid may be fed into a small preliminary setting tube before being homogenized, the capacity of this tube for a given set of conditions being determined by principles well understood by those skilled in the art in view of the disclosure herein. Thus, for example, a product that is too soft after crystallization indicates that setting had proceeded too far at the time of homogenizing and that the capacity of the tube is too large.

An arrangement of apparatus for carrying out the process of the invention will now be described with reference to the accompanying drawings in which:

Figure 1 is a diagrammatic representation of a complete arrangement of apparatus, which includes the precooling of the fat charge as described in the copending application referred to;

Figure 2 is a view, in cross section, of one embodiment of a homogenizing device.

Figure 4:
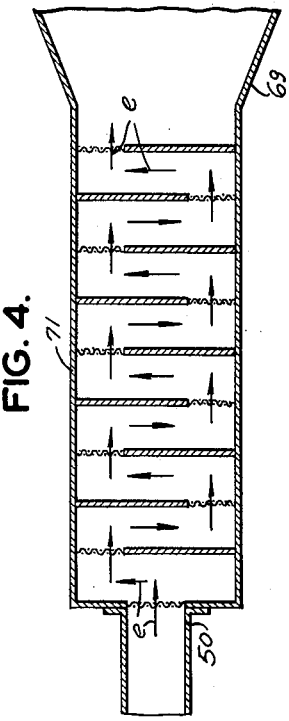
Figures 3 to 6, inclusive, are views, in cross section, of several alternative forms of homogenizing devices.
Figure 3:
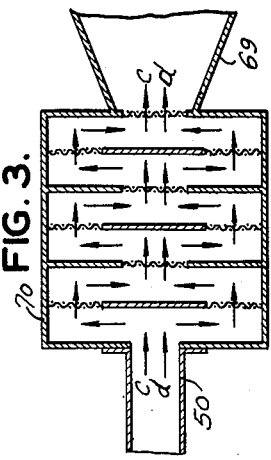
Figure 6:
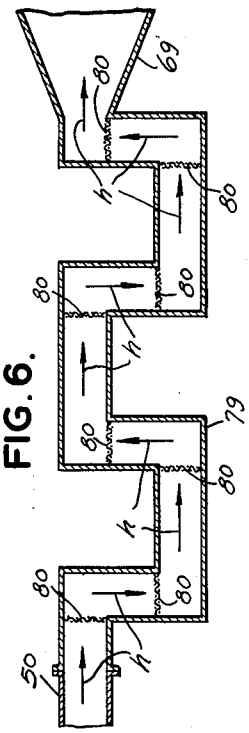

Referring to Figure 1, 11 is a reservoir for the liquid fat and 12 is a reservoir for the aqueous ingredients of margarine. Reservoir 11 is connected to a rotary pump 14 by a conduit 16 provided with a control valve 17. The delivery conduit 19 of pump 14 is connected to conduit 16 by a by-pass conduit 20 and by conduit 21 to a cooling unit 22 consisting of four series-connected tubes 24, only two of which are shown. Each tube 24 of the cooling unit 22 is surrounded by a water or brine jacket 26 and is fitted with an axial shaft 27 carrying helical scrapers 29. The cooling unit 22 is connected to a precrystallizing unit 30 by a conduit 31. This precrystallizing unit consists of a cylinder fitted with an axial shaft 32 carrying a row of radial rods 34 helically arranged through 120° and intermeshing with an array of fixed rods 36 attached to the wall of the cylinder. A conduit 37 connects the unit 30 to cylinders 39 of a proportioning pump 40, and a conduit 41, provided with a control valve 42, connects cylinder 44 of the proportioning pump 40 to reservoir 12. The cylinders 39 and 44 of the proportioning pump 40, which preferably are such as to supply material from reservoirs 11 and 12 automatically in the correct proportions, are connected by conduit 46 to a Votator unit 47, comprising one or more thin walled nickel tubes surrounded by a suitable low temperature cooling medium such as evaporating liquid ammonia and provided with internal rotating blades. Conduit 49 connects this Votator unit to a preliminary setting tube 50 which in turn is connected to a homogenizing device 51, shown in greater detail in Figure 2, and from which the material passes into a crystallizing unit 52.

Referring to Figure 2, one embodiment of the homogenizing device of this invention comprises a wire gauze cylinder 54 closed at one end by a plate 56 and contained within a tube 57 having flanges 59 and 60 at its ends. Baffle plates 61, 62, 63 and 64 are arranged within this cylinder and tube so as to create a zigzag path for any material passed therethrough. Flange 59 is connected to a flange 66 at the exit end of the preliminary setting tube 50, and flange 60 to a flange 67 at the inlet end of a conical expansion segment 69. This conical expansion segment is connected to a crystallizing unit 52 (Figure 1) in which the material sets to its final consistency.

In order that the margarine, once it has passed through the homogenizing device and has begun to set, be subjected to the minimum of interference by forces liable to cause a shearing therein, which may have a working effect producing an undesirable softening, it is necessary that its subsequent passage through the apparatus be as free as possible. In the arrangement illustrated, this is provided for by the conical expansion segment 69.

In operation, valves 17 and 42 are opened, and liquid fat is drawn from reservoir 11 and circulated through conduits 16, 19 and 20 by the pump 14. A major proportion of this circulating stream of fat is drawn through conduit 21 into the tubes 24 of the cooling unit 22 by the proportioning pump 40. The scrapers 29 in the tubes 24 are rotated at about 120 revolutions per minute and the flow of water or brine through the jacket 26 is adjusted to cool the fat to the desired degree. Small crystal nuclei of the high melting point glycerides are formed and are carried by the fat stream into the precrystallizing unit 30. By the time the liquid leaves the precrystallizing unit 30, a high proportion of the higher melting point glycerides capable of separating out as crystalline particles at the temperature attained by the fat will have separated, provided the agitation caused by the rods 34 on the shaft 32 is sufficiently vigorous.

Cylinders 39 and 44 of the proportioning pump 40 are adjusted to supply this precrystallized fat from the precrystallizing unit 30 and aqueous ingredients from reservoir 12, respectively, in correct proportions to the Votator unit 47 through conduit 46. Rapid chilling and emulsification takes place in the Votator in the manner already described.

After chilling the mixture, nucleated with minute fat crystals, it passes into the tube 57 of homogenizing device 51 through the preliminary setting tube 50. Partial setting of the chilled and emulsified material occurs in the tube 50 and the desired degree of preliminary setting may be obtained by suitably choosing the length and diameter, i. e., the capacity, of this tube. If, however, the material emerging from the stage of rapid chilling has the correct consistency for treatment by the present invention, the tube 50 can be omitted.

The stream of material during its passage through tube 57 is successively diverted through a right angle on encountering the baffle plates 61, 62, 63 and 64 and the end plate 56. The material is thus forced to traverse the zigzag path denoted by the arrows a and b in Figure 2, the combined effect of the passage through the screen and the change of direction of flow serving to break up any lumps and so to homogenize the material. It is thought that passing the material through a mesh screen and thereafter causing it to undergo a sudden change in its direction of flow exerts a homogenizing effect on the material somewhat in the following way. A lump of material, on being forced through the screen, emerges as a number of threads. If the material now continues its direction of flow, these threads tend to coalesce to become a lump once more. The sudden change of direction of flow however prevents the coalescence, the threads are further broken down by the next passage through a screen, and kept apart by the next change in direction. In this way a rapid homogenization of the lumps and the more fluid material surrounding them is achieved. The progressively increasing cross sectional diameter of segment 69 allows the stream of material to expand into the setting chamber 52 with a minimum of interference from forces liable to cause shearing.

The most suitable gauze for forming cylinder 54 is found by trial. 12 mesh/inch gauze has been found suitable if it is desired to obtain a rather firm margarine while an additional 20 mesh/inch gauze covering the last two sections of cylinder 54 has been found advantageous to obtain complete dispersion of the streaks in a rather softer margarine.

Figures 3 to 6 illustrate alternative devices for achieving the same effect given by the device shown in Figure 2. In the embodiments shown in Figures 3 and 4, the gauze cylinder, tube and baffles of the device illustrated in Figure 2 are replaced by composite plate and gauze baffles contained within a tube 70 in Figure 3 and 71 in Figure 4. The zigzag paths which the stream of chilled and emulsified material is forced to travel when passed through these devices are shown by the arrows c and d in Figure 3 and the arrows e in Figure 4.

Figure 5:
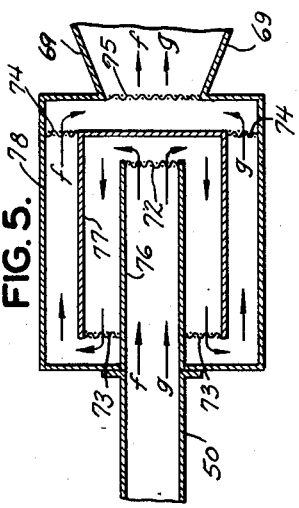

Figure 5 illustrates a device wherein the stream is forced to traverse zigzag paths denoted by the arrows f and g and created by an arrangement of screens 72, 73, 74 and 75, within three concentric tubes 76, 77 and 78. In the device illustrated in Figure 6, the chilled material is passed through a zigzag conduit 79 provided with mesh screens 80. The path of the stream in this embodiment is represented by the arrows h.

The above described embodiments are only five of a large number of possible alternative embodiments of mesh screens and obstructions for mechanically working the stream of chilled and emulsified material and for changing its direction of flow suddenly. It is to be understood that many other similar arrangements using mesh screens and obstructions are possible within the scope of the present invention as defined in the following claims.

We claim:

1. A homogenizing device comprising a vessel having an entrance opening and an exit opening of progressively increasing cross-sectional dimensions and containing a plurality of screens and baffles to define a tortuous path having an abrupt and substantial change in direction behind each screen between said openings.

2. A homogenizing device comprising a vessel having an entrance opening, an exit opening of progressively increasing cross-sectional dimensions, a screen, and means defining a tortuous path therethrough.

3. A homogenizing device comprising a conduit terminating in an opening of progressively increasing cross-sectional dimensions at one end, said conduit having a right angle turn therein and containing a screen immediately in advance of said turn.

4. A homogenizing unit for partially set margarine, comprising, a container having an entrance opening for receiving a flow of margarine, a first screen disposed across the line of flow for dispersing the margarine mass, first baffle means for diverting the line of flow of the screened margarine, a second screen disposed across the line of flow of the diverted and screened margarine for further dispersing the margarine mass thereby to effect homogenization of margarine, and an outlet opening of progressively increasing cross-sectional dimensions for permitting passage of the homogenized margarine from the container.

5. A homogenizing unit for partially set margarine, comprising, a container having an entrance opening for receiving a flow of margarine, a first screen disposed transversely of the line of flow for partially dispersing said margarine mass, baffle means for diverting the flow of said screened margarine in a direction substantially at right angles to the line of flow, a second screen disposed transversely of the redirected line of flow for further dispersing said margarine mass thereby to effect homogenization of said margarine, and an outlet opening of progressively increasing cross-sectional dimensions for directing said margarine from the container.

6. A homogenizing unit for partially set margarine as set forth in claim 5, including prior to said outlet opening, a second set of baffle and screen means for duplicating the said homogenizing action.

7. A multiple pass homogenizing unit for partially set margarine, comprising, a cylindrical container having an entrance and an exit opening at its respective ends, said exit opening being of progressively increasing cross-sectional dimensions, a cylindrical screen-walled cartridge having a diameter less than that of the said container inserted in said container co-axially therewith to establish flow areas within the cartridge and between the outer surface of the cartridge and the inner surface of the container, a first plurality of spaced baffle plates secured within the cartridge transversely of the longitudinal axis thereof and disposed at spaced intervals along the axis, said baffles being arranged to divert the margarine flowing in the cartridge through the screen-wall thereof into the area between the cartridge and the container, a second plurality of spaced baffle plates secured between the cartridge and the container and juxtaposed with respect to said first baffles along the axis of said cartridge for diverting the margarine thereby being screened and diverted in direction a plurality of times between the time of entering and leaving the said unit.

8. A margarine homogenizing unit as set forth in claim 7, including a screen for the cartridge wall having interstices of a given size in the first passes of the unit, for dispersing the unhomogenized margarine and interstices of smaller size in the latter passes of the unit for dispersing the partially homogenized margarine.

9. A continuous method of making margarine which comprises mixing a stream of the fatty ingredients with a stream of the aqueous ingredients to form a continuous stream of mixture, chilling and emulsifying the stream of mixture, homogenizing said stream of chilled mixture by screening it before it has completely set, immediately thereafter changing abruptly its direction of flow and then allowing the material to set to its final consistency with the minimum of interference by forces liable to cause shearing therein.

10. The method as defined in claim 9 wherein the step of homogenizing is carried out by subjecting the stream of chilled and emulsified mixture to screening in a tortuous path.

11. The method as defined in claim 9 wherein the step of homogenizing is carried out by repeatedly subjecting the stream of chilled and emulsified material to screening and changing abruptly its direction of flow immediately following each screening.

12. A homogenizing device comprising a vessel for the passage therethrough of a stream of partially set margarine along a tortuous path, said path being defined in the vessel by an entrance opening, an exit opening of progressively increasing cross sectional dimensions, a mesh screen across the path and between said openings, and baffle means between the mesh screen and the exit opening for causing a sudden change in direction of flow of the stream of margarine immediately after passage through the screen.

JOHN ROURKE.
WILLIAM THORNTON DOW.

REFERENCES CITED

The following references are of record in the file of this patent:

UNITED STATES PATENTS

| Number | Name | Date |
| --- | --- | --- |
| 1,345,657 | Zeuthen et al. | July 6, 1920 |
| 1,965,618 | Vogt | July 10, 1934 |
| 2,098,010 | Newton et al. | Nov. 2, 1937 |
| 2,125,245 | McCray | July 26, 1938 |
| 2,132,854 | Knott | Oct. 11, 1938 |
| 2,210,448 | Dodge | Aug. 6, 1940 |